United States Patent [19]

Williams

[11] 4,118,703
[45] Oct. 3, 1978

[54] PULSE RADAR APPARATUS

[75] Inventor: Philip David Lane Williams, Banstead, England

[73] Assignee: Decca Limited, London, England

[21] Appl. No.: 796,438

[22] Filed: May 12, 1977

[30] Foreign Application Priority Data

May 18, 1976 [GB] United Kingdom ............ 20484/76

[51] Int. Cl.² ............................................. G01S 7/30
[52] U.S. Cl. ............................................. 343/17.2 R
[58] Field of Search ..................... 343/17.2 R, 17.1 R

[56] References Cited

U.S. PATENT DOCUMENTS

| 3,046,547 | 6/1962 | Begovich | 343/7.7 |
| 3,266,038 | 8/1966 | Milne et al. | 343/11 R |

FOREIGN PATENT DOCUMENTS 802,373 10/1958 United Kingdom.

Primary Examiner—Maynard R. Wilbur
Assistant Examiner—Lawrence Goodwin
Attorney, Agent, or Firm—Mawhinney & Mawhinney & Connors

[57] ABSTRACT

Pulse radar apparatus particularly for marine use has a dispersive antenna so that transmitted pulses sequentially of two or more different frequencies are radiated in different azimuthal directions. The antenna is continuously rotated and the receiver has separate channels for the different frequencies and display means correlating information received on different frequencies from the same azimuth thereby to reduce sea-clutter on the display.

13 Claims, 5 Drawing Figures

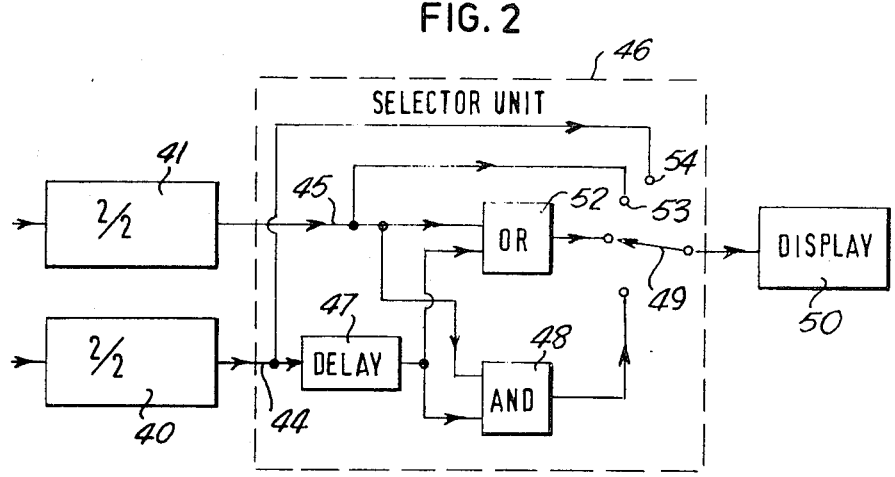
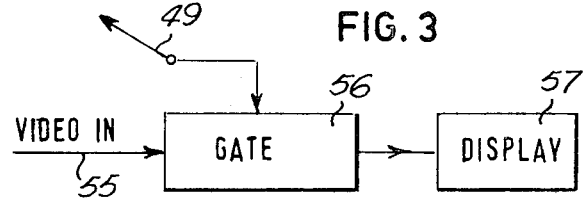
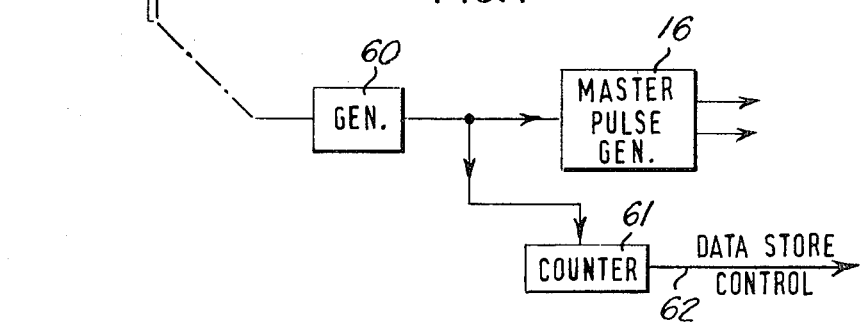

PULSE RADAR APPARATUS

BACKGROUND OF THE INVENTION

1. Field of the Invention

This invention relates to pulse radar apparatus and is concerned more particularly with apparatus employing frequency diversity to maximise target detection.

2. Prior Art

The performance of maritime radar apparatus, whether sited on the coast or on a ship or in an aircraft, is severely restricted by sea-clutter returns. It has been proposed to improve target detection in sea-clutter by the use of two channels operating on a different frequency. It is desirable that the samples are obtained with a time difference of 10 milliseconds or greater in order to achieve the best chance of sea-clutter decorrelation. To meet this objective, experimental equipment has been made using a high aerial rotation speed of about 600 rpm so that the time difference between successive scans of the aerial is of the order of 100 milliseconds. With such equipment, picture storage has been carried out making use of the phosphor on a cathode ray tube to give a storage over the time period of 100 milliseconds. The display repetition rate however of 10 Hz gives a flicker which makes the use of a camera or some other form of scan converter desirable. The main objections however to such techniques lie in the danger and problems of the high aerial rotation speed.

SUMMARY OF THE INVENTION

It is an object of the present invention to provide an improved form of pulse radar making use of correlation of signals on two or more different frequencies. For most purposes, the simplest arrangement using only two frequencies would be employed and in the following description reference will be made more specifically to such an arrangement; it will be apparent however from the following description that the techniques could be extended to three or more frequencies if desired.

According to the present invention, pulse radar apparatus comprises a dispersive aerial arranged to give a directional beam, the direction of which in azimuth depends on the frequency of the transmitted and received signals, means for continuously rotating the aerial, transmitting means coupled to the aerial to produce pulses sequentially at different frequencies, receiver means coupled to said aerial for receiving the radar return signals and separating the different frequencies to feed separate receiving channels and a display means correlating the information from the separate receiving channels in accordance with the relative angular displacements of the beams for the different frequencies transmitted and received by said aerial. In the simplest case only two different frequencies are employed and these are transmitted alternately. With a dispersive aerial, different frequencies produce beams in different directions and thus each rotation of the aerial provides two scans, the radar information from one being delayed in azimuth with respect to the other. By this arrangement, it is readily possible to obtain adequate time delay for decorrelation of sea-clutter signals whilst using aerial scanning speeds which can be similar to those conventionally use in marine radar, e.g. 20 r.p.m.

For correlating the information on the two channels, as will be described later, one may make use of the known angular displacement between the separate beams, e.g. by using a cathode ray tube display of the PPI (plan position indicator) or B-scope type in which a scanning trace has a position corresponding to azimuthal direction of received signals. Alternatively, the information in the different channels may be correlated by taking into account the time delay between corresponding signals on the different beams.

Conveniently the pulse repetition rate and aerial rotation speed are so chosen that the time interval between receiving a radar return from a target on one frequency and receiving the radar return from that target on the other frequency (that is the time taken for the aerial to rotate through an angle corresponding to the difference between the beam directions) is a known multiple of the pulse repetition period. For this purpose, it is convenient to derive the pulse timing signals from a generator driven by or in accordance with the aerial rotation so that, irrespective of the aerial speed, there will always be a predetermined number of pulses radiated during the time period between the different beams receiving corresponding signals from a target. The delay between corresponding signals is now measurable as a pulse count which is independent of the actual rotation speed of the aerial and thus a delay unit may be provided including a counter arranged to count signals from said generator to provide the required differential time delays. This is of importance since a time delay can be obtained by digital circuits independent of any variations in the aerial speed due, for example, to wind.

With the arrangement described above, considering a system providing two beams alternately the radar looks out on any single direction firstly on one frequency and then, a short time later, looks out in this direction on the other frequency, the time difference depending on the aerial rotation speed and the angle between the two beams. The two signals may be simply combined by using a time delay for the first signal of each pair; in other words the signals from one channel are passed through a time delay circuit giving a time delay equal to the time between the transmission of a pulse on that channel and the transmission of a pulse on the other channel to produce simultaneously signals corresponding to received signals from the same azimuthal direction. As explained above, the time delay may be obtained in digital circuitry by counting transmitted pulses if the repetition period is derived from the aerial rotation. The signals may then be combined and can be fed to a display device which may be a cathode ray tube. Other forms of display may be used and/or the signals may be processed in analogue or digital form for obtaining the required radar information.

It will be immediately apparent that three or more different frequencies could be employed; these may be transmitted in a cyclic sequence at time intervals which may conveniently be uniformly spaced. The choice of the transmitted frequencies in relation to the dispersive characteristics of the aerial determines the beam directions. The correlation of received signals from the separate channels is made in accordance with the differences of angular directions of the beams.

The aerial is conveniently a slotted waveguide array and may be similar to slotted waveguide aerials commonly used in marine radar apparatus.

Correlation between the signals from the two channels may be effected in an analogue manner, e.g. by displaying the signals on a PPI display with radar returns on the two channels used to brightness-modulate traces displaced by the appropriate angle corresponding to the difference in direction of the two beams.

Digital correlation techniques may alternatively be employed to combine the radar information and give an output signal to the display only when a radar response is obtained on both the channels or on each of the channels if there are more than two. Using a two-channel system, this requires a two-out-of-two correlating circuit. This assists in the rejection of uncorrelated noise spikes and some rain clutter. The rejection of sea-clutter however is achieved primarily by the time and frequency decorrelation of the clutter which is achieved by the simple combination of the received signal, for example in the phosphor of the cathode ray tube. Desired targets giving reflected signals will provide returns on both channels whereas sea-clutter and rain will in general not be correlated on the two channels and hence combination of the output of the two channels will give enhancement of required signals with respect to such clutter. The digitally correlated output may be used to gate the raw video signals or video signals after processing if the analogue information in those signals is required, e.g. for a brightness-modulated display. The gating cuts out the uncorrelated clutter returns.

The frequency difference of the channels should preferably be greater than the reciprocal of the shortest pulse used. To give the best sea-clutter decorrelation, the time difference between signals in the same direction on the two channels should be 10 milliseconds or greater. This time-difference is readily achieved utilising pulse repetition rates and aerial rotation speeds of the same order as are conventionally used in maritime radar equipment.

BRIEF DESCRIPTION OF THE DRAWINGS

FIGS. 2, 3, 4 and 5 are diagrams illustrating modifications of the apparatus of FIG. 1.

DESCRIPTION OF THE PREFERRED EMBODIMENTS

Figure 1:
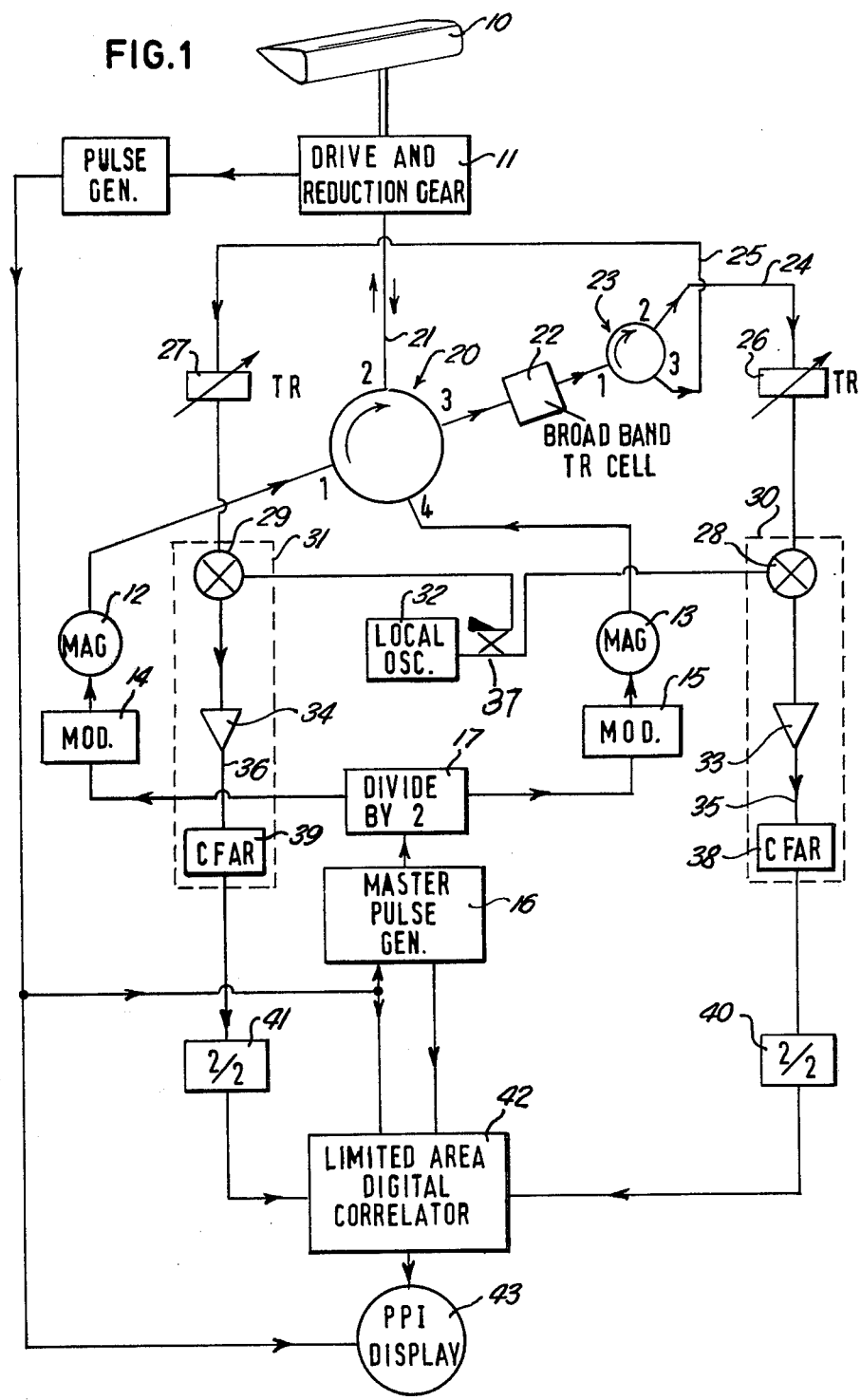
FIG. 1 is a diagram illustrating a pulse radar apparatus embodying the invention.

Referring to FIG. 1, there is shown diagrammatically a dispersive slotted waveguide aerial 10 which is continuously rotated at constant speed by a drive motor and reduction gear drive system 11. Two magnetrons 12, 13 tuned to two different frequencies are pulse-modulated respectively by modulators 14, 15 to provide short-duration radio frequency pulses alternately at the two different frequencies. The modulators 14, 15 are triggered by a master pulse generator 16 to control the time instants of pulse generation. In this particular embodiment the master pulse generator is controlled, in a manner to be described later to produce pulses at a frequency related to the aerial rotation speed but which, in this case, is 1365 pulses per second. These pulses from the master pulse generator are applied to a binary divider circuit 17 and alternate pulses from that divider circuit are applied to each of the two modulators 14, 15. Thus the two magnetrons 12, 13 produce radio frequency pulses alternately and equispaced in time. These radio frequency pulses are applied to ports Nos. 1 and 4 of a four-port circulator 20 and fed from port No. 2 of the circulator via a waveguide 21 to the aerial 10. When one magnetron is pulsed, the impedance of the non-pulsed magnetron is such that all the power from the pulsed magnetron is fed into the aerial apart from a very slight loss in the circulator 20.

Radio frequency signals picked up by the aerial, in particular radar return signals, are fed back through the waveguide 21 to port No. 2 of the four-port circulator and pass from port No. 3 to a broad band TR cell 22 and thence to port No. 1 of a three-port circulator 23. Ports Nos. 2 and 3 of circulator 23 are coupled by waveguides 24, 25 respectively to tunable TR cells 26, 27 acting as filters thereby separating the received signals into the two different frequencies. These separate frequency signals are fed to mixers 28, 29 in respective receiving channels 30, 31. In the receiver channels, these received radio frequency signals are mixed with signals from local oscillator 32 to produce intermediate frequency signals fed to receivers 33, 34. In this particular embodiment, a single local oscillator 32 is used which is tuned to a frequency below the frequency of that one of the magnetrons which operates at the higher frequency and is held by an automatic frequency control circuit if necessary. The output of this local oscillator 32 is fed via a power divider 37 to the respective mixers 28, 29. The separation frequency of the two magnetrons is arranged to be twice the intermediate frequency of the receiver thereby enabling this single local oscillator to serve for both receivers. Obviously however separate local oscillators might be used if so desired.

It is convenient to use intermediate frequencies of 60 MHz (this being a frequency used in many marine radars) and thus the two magnetrons are arranged to have a frequency difference of 120 MHz. With a pulse length of 0.05 microseconds, this frequency difference is some 5 times larger than the reciprocal of the pulse length, thereby giving, as will be explained later, good sea-clutter decorrelation and enabling a suitable look-back angle to be obtained with the dispersive waveguide aerial. With slotted waveguide aerials such as are currently used on marine radars, this frequency difference would give a look-back angle of 1°. Using 2048 pulses from each transmitter per revolution and a look-back angle of 1°, the storage capacity required is that corresponding to 6 pulses. It is convenient to control the master pulse generator using a pulse generator 16 driven from the aerial drive so that the number of pulses produced is a fixed number per aerial revolution irrespective of the aerial rotation speed. If there are 4096 pulses per aerial revolution, a rotation speed of 20 r.p.m. requires 1365 pulses per second from the master generator as previously described.

The outputs from the receivers 33, 34 of the two receiving channels are detected in the receivers to give video signals on leads 35, 36. These signals are each radar video signals similar to those for a conventional pulse radar and contain information about wanted targets but also include unwanted thermal noise, sea-clutter and rain clutter and other radar interference. The signals are passed separately through respective CFAR (constant false alarm rate) circuits 38, 39 processing the video signals. Essentially, in the present case, these circuits are amplitude discriminators sensing the amplitude of the incoming signal for each range increment in each radar scan and giving a digital 1 or 0 output according as to whether an incoming signal exceeds or is below the local clutter level. Other more complex signal processing however may be carried out. From the CFAR circuits 38, 39, signals on the two channels are separately fed to respective two-out-of-two integrating circuits 40, 41.

The two-out-of-two integration requires a threshold control and the CFAR circuits 38, 39 essentially enable a threshold to be set. They may however include other signal processing features such as for example pulse length discriminators. The threshold control may be adjustable and adaptive control may be provided. The two-out-of-two integrators 40, 41 comprise essentially digital stores for storing the processed and digitised radar video for each range cell for the time period between successive transmitted pulses and comparator means to give outputs for each range cell only when a radar return signal is received from two successive transmitted pulses. This processing is primarily to reject uncorrelated signal pulses from other radars. It does give some help in the rejection of uncorrelated noise spikes and some rain clutter but does not, in itself, give very much help in rejecting correlated sea-clutter which is dealt with as will be described below.

The CFAR circuits 38, 39 and two-out-of-two integrators 40, 41 need not have a range solution as good as the shortest pulse used because the outputs of the two-out-of-two integrators may, if desired, be used to gate the original analogue video output circuit without loss of target detail or, more preferably, the analogue output from the CFAR circuits 38, 39 to take advantage of the video processing effected in those circuits.

The correlation of the signals on the two channels 30, 31 requires storage for a time period corresponding to the time taken for the aerial to rotate through the angle corresponding to the difference in angular direction of the two beams. As will be described later, there are a number of ways of achieving this. In the arrangement illustrated in FIG. 1, this correlation is effected by utilising the digitised information from the two-out-of-two integrators 40, 41 in digital form with a digital delay circuit. In an example using 2048 pulses from each transmitter per revolution of the antenna and a look-back angle of 1° corresponding to 120 MHz difference frequency on a conventional marine radar slotted waveguide aerial, the storage required is for 6 radial scans. In other words the number of bits required will be 6 times the number of range resolution cells for each radar range scan. Correlation can then be effected by feeding delayed video signals from the receiving channel corresponding to the first of the two beams into an AND gate where they are combined with undelayed signals from the second of the two channels. Such an arrangement is shown in FIG. 1, where the outputs from the two-out-of-two integrators 40, 41 are fed to a limited area digital correlator 42 having digital storage for radar information from 6 radial scans and an AND gate for combining the delayed data from one channel with the undelayed data from the other channel. The output from this correlator is fed directly to a plan position indicator 43, as shown, or is used to gate processed radar video from one or both channels to the plan position display.

Referring to FIG. 2, there is shown a selector arrangement in which the outputs from the two-out-of-two integrators 40, 41 on leads 44, 45 are applied to a selector unit 46 including a delay 47 delaying signals on lead 44. The output from the delay 47 is combined in an AND gate 48 with the undelayed output from the second channel on line 45. A selector switch 49 enables the output of this AND gate 48 to be selected as an output to be fed to a plan position indicator display 50. The selector switch 49 alternatively enables selection of the output from an OR gate 52 so as to display the signals from both channels, with the earlier received signals delayed by delay 47 so that they are appropriately superimposed thereby giving all the input information. The switch 49 has two further positions 53, 54 to permit selection of the output from one or other of the two channels.

FIG. 3 illustrates a modification of the arrangement of FIG. 2 in which the digital output at switch 49 is used as gate control signal controlling a gate 56 through which raw or processsed video signals on a lead 55, passed to a display 57 such as e.g. a cathode ray tube PPI display or B-scope display. With selector switch 49 set to select the output of AND gate 48, the video signals are gated by the correlated output of the two channels. By using the digital output of a correlator to gate analogue video signals, the cathode ray tube display will appear like a conventional cathode ray tube display with the brightness of the signals dependent on their amplitude but, by the processing technique described above, unwanted signals are excluded. In particular, by the delay between the two channels, substantial reduction of sea-clutter signals can be obtained.

As previously explained, the delay or storage time required fo correlating the information from the two channels is the time taken for the aerial to rotate through the angle corresponding to the difference in angular direction of the two beams. It is a common practice in radar equipment to use a generator driven by the aerial or by the aerial drive to produce signals at a rate dependent on the instantaneous rate of rotation of the aerial; the generator produces a given number of cycles of output for each rotation of the antenna, each cycle corresponding to a given angular movement. Thus by counting cycles of output of such a generator, a delay time corresponding to the angular difference between the two beams can be obtained irrespective of any variations in aerial speed due to wind or other causes. As is illustrated diagrammatically in FIG. 4, such a generator 60 driven by the aerial 10 and producing signals corresponding to predetermined step changes in the angular position of the aerial may be utilised to control the master pulse generator 16 and may also be fed to a counter 61 to provide, on lead 62, control pulses for controlling the read-out of stored radar data, which, in the particular case of FIG. 1, has to be stored for six radar pulse repetition periods.

In the arrangements thus far described, the delay of signals has been effected using digital techniques. The comparison of the signals on the two channels 30, 31 of FIG. 1 requires storage for a time period corresponding to the time taken for the aerial to rotate through the angle corresponding to the difference in angular direction of the two beams. One simple and convenient way of obtaining the storage is to make use of the analogue storage inherent in the long lag phosphors used on cathode ray tubes for plan position displays. For this purpose, the plan position display must essentially have two rotating traces separated by the appropriate angle, these two traces being rotated together and brightness-modulated by the signals from the appropriate channels. Here it will be immediately apparent that the modulation could be effected by the digital outputs from the two-out-of-two integrators 40, 41 or by the video or processed video analogue signals obtained using the integrator outputs to gate an analogue video signal. The two traces required in this way may be produced using a fixed coil display of the kind where a line scan trace may be produced in any angular direction as required merely by addressing the appropriate scan pulse number to a random memory look-up table to provide the appropriate signals to a time base resolver giving electronic scanning. The scan pulse number can be obtained readily by counting the transmitted pulses in each aerial rotation if the pulse repetition frequency is controlled in accordance with the angular position of the aerial as previously described.

Another way of producing the required two trace display is to use a conventional rotating coil display modified to have orthogonal deflection coils on the rotating coil assembly. The main scan is produced in the normal way by feeding the scanning waveform into the main deflection coil on the rotating coil assembly and the "look-back" scan may then be produced by feeding the scan as before into the main coil but with a proportion of the scanning waveform fed into the orthogonal coil. Other techniques for producing the required two-trace display with two traces displaced by a predetermined angle will however be readily apparent.

Figure 5:
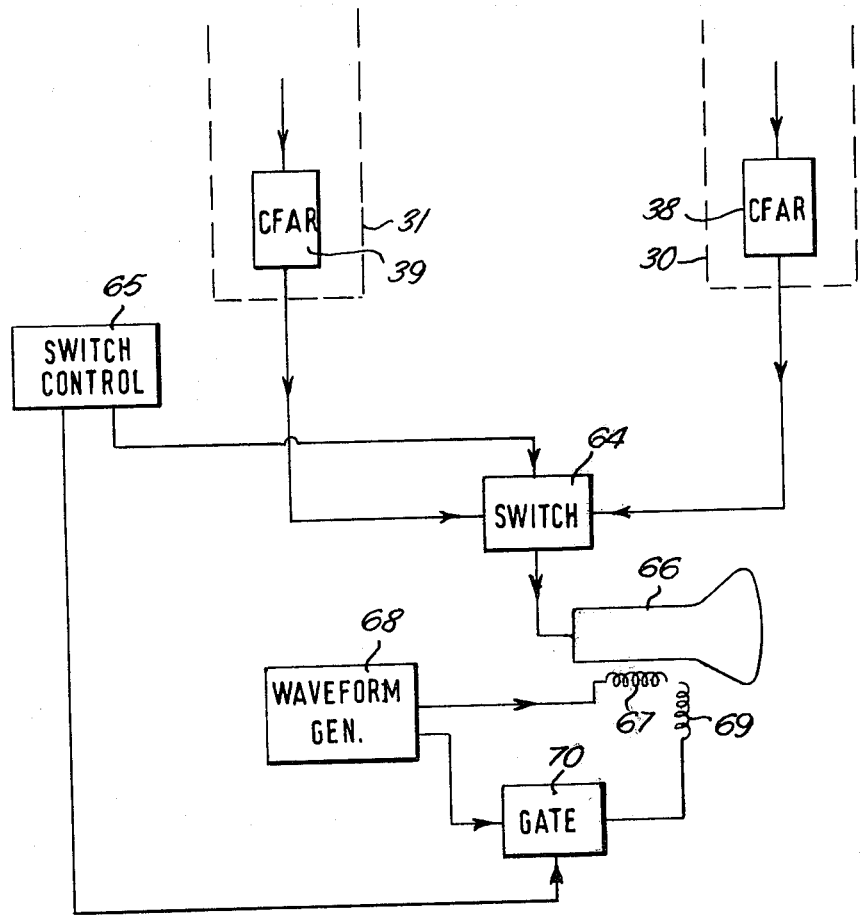

Such an arrangement is shown in FIG. 5 which illustrates a modification of part of the radar apparatus of FIG. 1. Referring to FIG. 5, the radar video signals from the CFAR units 38, 39 in channels 30, 31 are fed to a switch 64 which is operated by a switch control unit 65 so that radar video signals from the two channels 30, 31 are applied for alternate radial scans as brightness modulation signals to a cathode ray tube 66. In this embodiment, a rotating coil display system is used with a main deflection coil 67 which is rotated in the known way about the cathode ray tube 66 in accordance with the aerial rotation and is fed with a scanning waveform from a waveform generator 68 to produce a radial time base trace in an angular position corresponding to one of the aerial beams and thereby to produce a PPI display. An auxiliary deflection coil 69, orthogonally disposed with respect to the main coil 67, is fed with a known proportion of the scanning waveform via a gate 70, so that, when the gate is open, the position of the scanning trace corresponds to the azimuthal direction of the second beam. The gate 70 is controlled by the switch control unit 65 in synchronism with the operation of the switch 64. Thus the signals from the two beams are displayed in the correct positions on the tube screen so that responses from any target received in the two beams are superimposed on the display. The cathode ray tube phosphor thus provides the required data storage.

Although the invention has been described more specifically with the use of two channels and two frequencies, it will be readily apparent that it would be possible to extend it to the use of three or more channels with correspondingly different frequencies. The transmissions may be evenly spaced in time; the frequencies can be chosen then to give the desired angular displacements of the various beams. Such an arrangement thus gives further information or correlation, which correlation is most conveniently effected digitally.

It is convenient, both in a two-channel system or in a system having more than two channels to arrange the transmitters to operate in sequence but it would be possible to transmit simultaneously on all the channels, as the return signals are separated in accordance with their frequency. It will further be noted that, in all these arrangements, by deriving the pulse repetition frequency from the aerial rotation, the required correlation is effected despite changes in aerial rotation speed such as for example commonly occur during each aerial revolution due to the wind loading. The aerial speed moreover may be changed to suit operational conditions but the display will still show the same number of radial display traces in each revolution.

I claim:

1. Pulse radar apparatus comprising a dispersive aerial arranged to give a directional beam, the direction of the beam with respect to the aerial in azimuth depending on the frequency of the transmitted and received signals, means for continuously rotating the aerial in the azimuth plane, transmitting means coupled to the aerial to produce pulses sequentially at a plurality of different frequencies, receiver means coupled to said aerial for receiving the radar return signals of the transmitted frequency after each transmitted pulse and separating the different frequencies to provide separate signals corresponding to the radar returns for each frequency, and display means correlating radar returns received as different frequency signals on separate channels from targets in the same azimuthal direction so that, for each target, in each aerial rotation, the different frequency transmissions provide separate signals angularly displaced by the aerial dispersion but which are correlated in the display means.

2. Pulse radar apparatus as claimed in claim 1 wherein said transmitting means are arranged to produce pulses alternately at two different frequencies.

3. Pulse radar apparatus as claimed in claim 1 and having display means comprising a cathode ray tube display, with a brightness-modulated time base swept over the display screen, wherein said display means includes means arranged to display the signals from the separate channels on time base traces on the cathode ray tube displaced relative to one another in accordance with the relative angular displacements of the respective aerial beams, so that the target responses on the display from any one target produced by the different frequency transmissions in one aerial rotation are superimposed.

4. Pulse radar apparatus as claimed in claim 1 wherein the display means comprises a cathode ray tube display with a time base trace displaced in accordance with the rotation of the aerial, means for introducing differential time delays between the signals from the separate channels, the differential time delays corresponding to the relative angular displacements of the beams so that simultaneous differentially delayed received signals are from the same azimuthal direction and means for applying the differentially delayed signals as a modulation to said time base trace.

5. Pulse radar apparatus as claimed in claim 4 wherein said transmitting means and said means for rotating the aerial are arranged so that the time interval between receiving a radar return from a target on one frequency and receiving the radar return from that target on the other frequency, that is the time taken for the aerial to rotate through an angle corresponding to the difference between the beam directions, is a predetermined multiple of the pulse repetition period.

6. Pulse radar apparatus as claimed in claim 5 wherein said transmitting means includes a generator for pulse timing signals controlling the sequential pulse production driven in accordance with the aerial rotation so that there will always be a predetermined number of pulses radiated during the time period between the separate beams receiving corresponding signals from a target and wherein said means for introducing differential time delays between the signals from the separate channels includes a delay unit having a counter arranged to count signals from said generator to provide said differential time delays.

7. Pulse radar apparatus as claimed in claim 1 wherein the aerial is a slotted waveguide aerial.

8. Pulse radar apparatus as claimed in claim 1 wherein the display means correlating the information includes means for digitising the outputs from the separate channels, differential delay means for introducing relative delays between the digitised channel outputs so that signals from the same azimuthal direction received on different channels are available simultaneously and digital correlation means for correlating the differentially delayed signals.

9. Pulse radar apparatus as claimed in claim 8 wherein said digital correlation means are arranged to give an output only when differentially delayed digitised signals are provided simultaneously from each of the channels.

10. Pulse radar apparatus as claimed in claim 8 and having visual display means arranged to display the correlated differentially delayed signals.

11. Pulse radar apparatus as claimed in claim 8 and having visual display means arranged to display video signals from at least one of said receiving channels, the video signals being gated by the correlated differentially delayed signals.

12. Pulse radar apparatus as claimed in claim 1 wherein said transmitting means transmits pulses of not less than a predetermined duration and wherein the frequency difference of the channels is greater than the reciprocal of said predetermined duration.

13. Pulse radar apparatus as claimed in claim 1 wherein means for rotating the aerial and the transmitting means are arranged so that the time difference between signals in the same direction on the two channels is at least 10 milliseconds.

* * * * *